Nov. 3, 1953
G. W. HATCHER, SR
2,658,185
ELECTRICAL CONNECTOR
Filed May 22, 1950
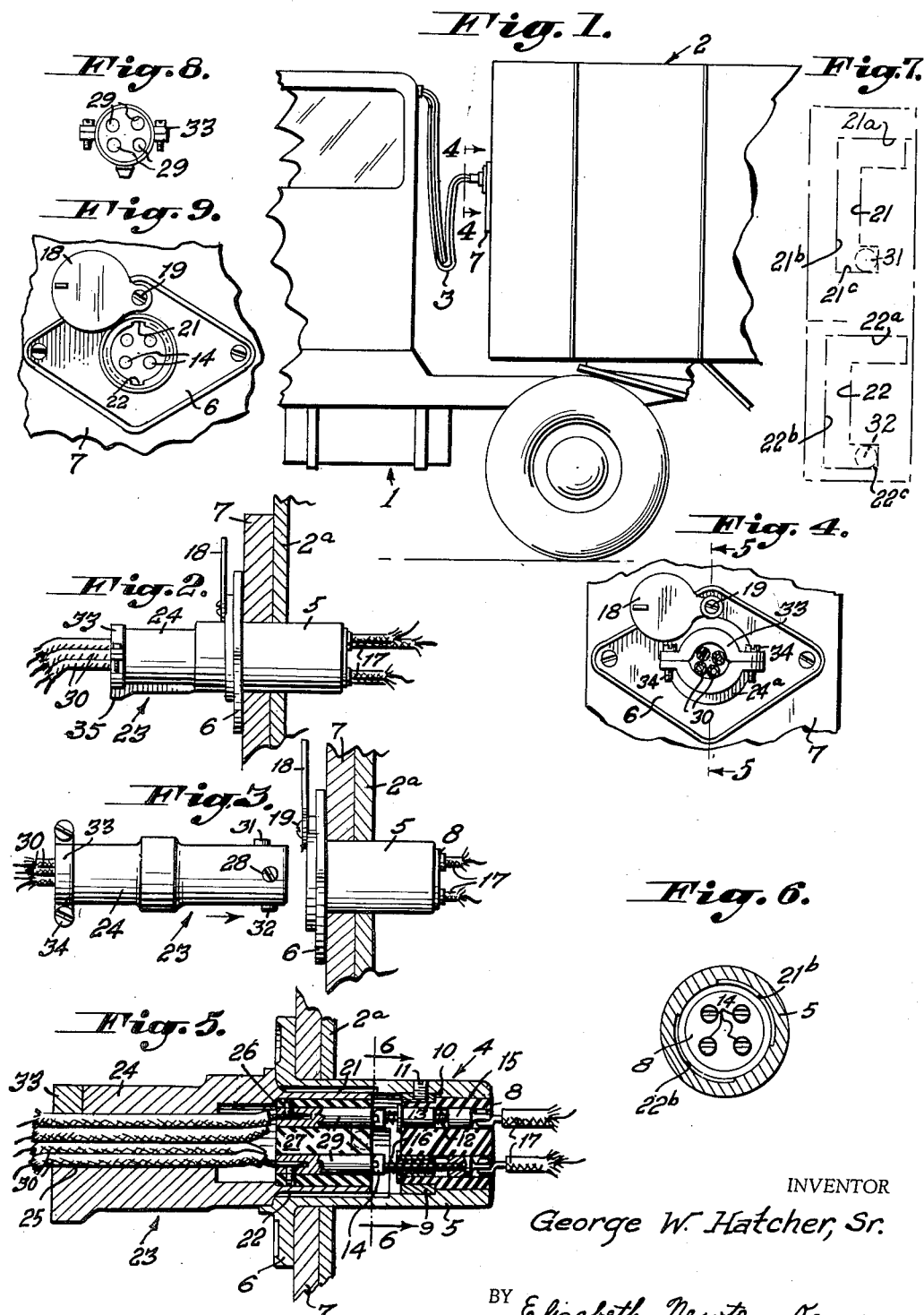
INVENTOR
George W. Hatcher, Sr.
BY Elizabeth Newton Dew
ATTORNEY Patented Nov. 3, 1953

2,658,185

UNITED STATES PATENT OFFICE 2,658,185

ELECTRICAL CONNECTOR

George W. Hatcher, Sr., Richmond, Va.

Application May 22, 1950, Serial No. 163,370

1 Claim. (Cl. 339—188)

This invention relates to separable cable connectors. While the invention will be described in connection with the tractor and detachable trailer forming a load-carrying automotive vehicle, it will be clear that the invention is not limited to the particular use shown but is of utility in a wide range of facilities and applications where it is desired to provide a positive but quickly detachable connection in one or a plurality of electrical circuits.

The more important objects are (1) to provide a separable connector the parts of which can be quickly connected or separated; (2) to provide a connector in which the parts, when connected are positively locked in contacting position and which cannot be separated by vibration or road shocks; (3) to provide a connector in which the same springs act both to effect good electrical contact and to prevent separation of component parts; (4) to provide a connector in which the act of connecting the parts acts to clean the contact surfaces thereof; and (5) to provide a connector which can be locked in position with the parts in one rotational relation only so that erroneous connection of a multi-contact connector, is prevented.

Other objects and advantages will become apparent from a study of the following description in connection with the drawings.

In the drawings:

Figure 1 is a side elevation of a portion of a tractor-trailer combination showing one use for the invention in forming a disconnectable electric coupling between the tractor and trailer.

Figure 2 is a side elevational view to an enlarged scale showing the socket and plug in locked or interengaging relation.

Figure 3 is a view corresponding to Figure 2 but showing the plug removed from its socket or receptacle.

Figure 4 is a sectional view taken upon a plane identified by line 4—4 of Figure 1.

Figure 5 is a longitudinal sectional view to an enlarged scale and taken in a plane identified by the line 5—5 of Figure 4.

Figure 6 is a transverse sectional view taken upon the line 6—6 of Figure 5 showing the circumferential portions of the bayonet slots.

Figure 7 is a development of that portion of the socket embracing the bayonet slots.

Figure 8 is an end view of the multi-prong plug, and

Figure 9 is an end view of the socket with plug removed and cover plate swung to one side.

Referring in detail to the drawing, the numeral 1 identifies generally the tractor and 2 the load-carrying trailer of a standard and well-known automatic vehicle combination. The numeral 3 identifies a multi-conductor cable adapted to conduct current from the tractor to the running lights and other facilities of the trailer. In the present instance, four individual conductors are shown. Inasmuch as the trailer is readily detachable from its tractor, so that the tractor may be coupled to other trailers, the cable connection 3 must be easily disconnectable.

For this purpose I have shown a socket or receptacle generally identified by the numeral 4, Figure 5, and comprising a tubular casing 5 having an integral mounting flange 6 at one end. The flange is shown as secured by screws to a mounting plate 7 carried by the forward wall 2a of the trailer. The other end of the socket is closed by a plug of dielectric material 8 having a metallic ring 9 secured to its reduced inner end. This ring is a little larger in diameter than the body of the plug so that when the plug is inserted from the flanged end of casing 5, the ring 9 abuts a circular shoulder 10 formed within the casing, as shown upon Figure 5. The limiting position of plug 8 is thereby determined and it may be held in this position by any suitable means such as a set screw 11.

The plug 8 has four symmetrically arranged axial holes 12 therein in each of which a spring-pressed contact is located. As shown upon Figure 5, each contact consists of a thimble 13 fitting a respective hole 12 and flanged outwardly at one end. A screw 14 extends through an aperture in the other end of the thimble and is threaded into a nut 15 slidably mounted in the hole. A coil spring 16 surrounds the shank of each screw 14 and abuts the head thereof at one end and the bottom of thimble 13 at the other, whereby the spring is stressed in compression by a thrust on the end of the screw to slide the same and its nut axially within the hole. The end of each nut 15 has a flattened apertured end to receive the end of a respective cable 17. A cover 18 may be pivoted at 19 to the socket to be swung down over the opening to provide weathertight protection for the contacts when the plug is removed from the socket. The inner wall of socket casing 5 has two bayonet slots 21 and 22 formed therein each of the same general shape and extending through an effective range of 90°. However, from Figures 5 and 7 it will be noted that the bottom or axially remote end of slot 21 is positioned at lesser distance from the flanged end of casing 5 than the corresponding end of slot 22. As best shown in Figure 7, slot 22, for example, has a straight axial portion 22a, a circumferentially extending bottom portion 22b and an axially extending locking portion 22c.

The plug is generally identified by the numeral 23 and consists of a generally cylindrical body portion 24 having a central axial bore 25 counterbored to form a circular shoulder 26 axially spaced from the inner end of the plug. A contact holder 27 of dielectric material slidably fits the counterbored end of the plug body and is of a length such that when one end seats on shoulder 26 its other end is flush with the end of the plug, as shown in Figure 5. The cylindrical holder 27 may be secured in position in plug body 24 and against shoulder 26 by any suitable means such as a set screw 28, Figure 3. The holder 27 is axially drilled to receive four contact rods 29 each adapted to make electrical contact with the head of a respective screw 14 when the plug is fully seated and locked in the socket. The outer end of each rod 29 is axially drilled to receive the ends of conductors 30 each of which may be held within its hole in rod 29 by set screws as shown upon Figure 5.

The end of plug body 24 has a pair of 180° spaced pins or lugs 31 and 32 each adapted to fit a respective one of the bayonet slots 21 and 22 in socket casing 5. The relation of the parts is such that when the plug is inserted in the manner shown in Figure 3, each lug rides along its slot 21 or 22 until the bottom portions 21b and 22b are simultaneously reached. Prior to this, the end of plug portion 27 has engaged the ends of screws 14 and forced them axially to tension springs 16. Then as the plug is turned, each lug rides along the bottom portion of its slot. Further rotation is prevented when the lugs reach the ends of the bottom portions 21b and 22b. The plug is then released and the thrust of springs 16 act to move the plug axially outwardly a short distance until the lugs are fully seated in the locking portions of the respective bayonet slots as indicated in Figure 7. A semi-circular clamp member 33 is provided and held in position against an integral semi-circular flange 24a of portion 24, by screws 34 to clamp the leads 30 in position within the body portion 24 and aid in preventing their withdrawal. If desired, an insulating band, not shown, may be thus clamped about the leads. When the plug is fully seated in its socket, each contact 29 engages only the head of a respective screw 14 so that four separate lead-in conductors are provided to effect individual circuit connections for any desired facilities of the trailer. Thus, for example, one wire may supply all clearance lights, a second wire may provide current for the stop lights, a third wire the right signal light and the remaining wire the left signal lights.

I have therefore provided a separable multi-lead connector which can be simply and quickly connected and disconnected. When a trailer is hooked up with its tractor for a haul, the plug 23 is grasped, inserted in socket 4 with the lugs 31 and 32 sliding in respective grooves or channels 21 and 22. When the lugs reach the bottom of the grooves, springs are under tension and after the plug is turned through 90° clockwise, and released, the spring tension acts to translate the plug slightly outwardly until the lugs are fully seated in axial end portions 21c and 22c. The aforesaid 90° rotation also causes a wiping action of the head of each screw across its contact 29, whereby the contacts are, in effect, self cleaning. Good electrical contacts are thereby assured which are unaffected by vibration and relative movement between the tractor and the trailer. In the model illustrated 12-gage wire is used. When fully seated in the socket, springs 16 exert a total force of about 20 pounds on the plug. Due to the difference in distances between the end of the socket and the circumferential portions of the bayonet grooves, 180° ambiguity in insertion of the plug is impossible and proper connection of each lead is assured. While the plug is thus firmly and positively locked in operative position in the socket, disconnection is easily effected by a combined inward thrust thereon and counter-clockwise turning, followed by a straight axial pull. If desired an indicator projection 35 may be provided upon the plug which extends horizontally to the right, for example, when the plug is thrust into the socket and moves into the lower vertical position when the coupling is fully locked. When such an indicator is provided, the bayonet slots may be identical and both lugs may be at the same distance from the end of the plug.

While I have shown the preferred form of the invention as now known to me, various substitutions and modifications will occur to those skilled in the art after a study of the foregoing disclosure. Hence I do not wish to be limited to the precise details of construction shown; and it is my desire and intention to reserve all modifications falling within the scope of the subjoined claim.

I claim:

In a separable connector for electric cables, a metallic tubular receptacle, a first dielectric plug fixed within and closing a first end of said receptacle, there being a plurality of axially-extending, equally circumferentially spaced holes through said plug, a metallic contact slidably mounted in each hole, means yieldingly urging each contact axially toward the second end of said receptacle, there being a pair of diametrically-opposite L-shaped grooves in the internal wall of the second end of said receptacle, each said groove comprising an axially-extending portion and a communicating circumferentially-extending portion, said circumferentially-extending portions lying in respective transverse axially-spaced planes along said axis, a metallic insert comprising a tubular end portion insertable into the second end of said receptacle, a pair of diametrically opposite projections fixed externally on said tubular end and axially spaced to correspond with the axial spacing of the circumferentially-extending portions of said grooves, whereby said tubular end portion can be properly inserted into the second end of said receptacle and turned to cause each said projection to ride along to the end of its said circumferentially-extending grooves, for one rotational relation of said portion and receptacle only, to determine a final operative position, a second dielectric plug closing and fixed in the tubular end portion of said insert, there being a plurality of axially-extending circumferentially-spaced holes in said second plug each axially aligned with a respective hole in said first plug when said plugs are in said operative relation, a plurality of metallic rods each fixed in a respective one of the holes in said second plug, the ends of said end portion, second plug and rods being substantially flush, whereby each said metallic contact is urged against its respective rod, when said portion and receptacle are in said final operative position, and means adapting each contact and rod for securement thereto of a respective one of a plurality of electrical conductors.

GEORGE W. HATCHER, Sr.

References Cited in the file of this patent

UNITED STATES PATENTS

| Number | Name | Date |
| --- | --- | --- |
| 1,705,022 | Lewellen | Mar. 12, 1929 |
| 1,761,436 | Douglas | June 3, 1930 |
| 2,015,953 | McDowell | Oct. 1, 1935 |

FOREIGN PATENTS

| Number | Country | Date |
| --- | --- | --- |
| 385,491 | France | Mar. 17, 1908 |
| 813,967 | France | Mar. 8, 1937 |